US009800418B2

(12) United States Patent
Antipa

(10) Patent No.: US 9,800,418 B2
(45) Date of Patent: Oct. 24, 2017

(54) SIGNATURE PROTOCOL

(71) Applicant: INFOSEC GLOBAL INC., Toronto (CA)

(72) Inventor: Adrian Antipa, Brampton (CA)

(73) Assignee: INFOSEC GLOBAL INC., Toronto (CA)

( * ) Notice: Subject to any disclaimer, the term of this patent is extended or adjusted under 35 U.S.C. 154(b) by 52 days.

(21) Appl. No.: 14/721,548

(22) Filed: May 26, 2015

(65) Prior Publication Data

US 2016/0352525 A1 Dec. 1, 2016

(51) Int. Cl.
*H04L 9/32* (2006.01)
*H04L 9/30* (2006.01)
*H04L 9/06* (2006.01)

(52) U.S. Cl.
CPC .......... *H04L 9/3252* (2013.01); *H04L 9/0618* (2013.01); *H04L 9/3066* (2013.01); *H04L 9/3242* (2013.01)

(58) Field of Classification Search
None
See application file for complete search history.

(56) References Cited

U.S. PATENT DOCUMENTS

| | | | |
|---|---|---|---|
| 6,279,110 B1 | 8/2001 | Johnson et al. | |
| 6,782,100 B1* | 8/2004 | Vanstone | H04L 9/3066 380/259 |
| 7,587,605 B1* | 9/2009 | Venkatesan | H04L 9/3247 380/30 |
| 8,213,604 B2 | 7/2012 | Xu | |
| 8,467,535 B2 | 6/2013 | Struik | |
| 8,775,813 B2* | 7/2014 | Brown | H04L 9/3066 713/176 |
| 2001/0008013 A1 | 7/2001 | Johnson et al. | |
| 2007/0189527 A1* | 8/2007 | Brown | H04L 9/3066 380/44 |
| 2012/0096273 A1* | 4/2012 | Campagna | H04L 9/3066 713/176 |
| 2013/0170644 A1 | 7/2013 | Lambert | |
| 2015/0006900 A1 | 1/2015 | Gallant et al. | |

FOREIGN PATENT DOCUMENTS

| | | |
|---|---|---|
| CA | 2228185 A1 | 7/1998 |
| FR | 2982106 A1 | 5/2013 |

OTHER PUBLICATIONS

International Search Report corresponding to PCT/CA2014/050604; Canadian Intellectual Property Office; dated Sep. 9, 2014.
Written Opinion of the International Searching Authority corresponding to PCT/CA2014/050604; Canadian Intellectual Property Office; dated Sep. 9, 2014.
Shen, S. et al, "SM2 Digital Signature Algorithm", Internet Engineering Task Force, Internet-Draft, draft-shen-sm2-ecdsa-00, 16 pages, Oct. 24, 2011, http://tools.ietf.org/html/draft-shen-sm2-ecdsa-00.

(Continued)

*Primary Examiner* — Brandon Hoffman
(74) *Attorney, Agent, or Firm* — Bhole IP Law; Anil Bhole

(57) ABSTRACT

The present invention relates to data communication systems and protocols utilized in such systems.

16 Claims, 3 Drawing Sheets

(56) References Cited

OTHER PUBLICATIONS

Translated Office Action for corresponding Saudi Patent Application No. 114350626; Saudi Patent Office; dated Sep. 1, 2015.
International Search Report corresponding to PCT/CA2015/050476; Canadian Intellectual Property Office; dated Jan. 11, 2016.
Written Opinion of the International Searching Authority corresponding to PCT/CA2015/050476; Canadian Intellectual Property Office; dated Jan. 11, 2016.

* cited by examiner

SIGNATURE PROTOCOL

TECHNICAL FIELD

The present invention relates to data communication systems and protocols utilized in such systems.

BACKGROUND

Data communication systems are used to exchange information between devices. The information to be exchanged comprises data that is organized as strings of digital bits formatted so as to be recognizable by other devices and to permit the information to be processed and/or recovered.

The exchange of information may occur over a publically accessible network, such as a communication link between two devices, over a dedicated network within an organization, or may be between two devices within the same dedicated component, such as within a computer or point of sale device.

The devices may range from relatively large computer systems through to telecommunication devices, cellular phones, monitoring devices, sensors, electronic wallets and smart cards, and a wide variety of devices that are connected to transfer data between two or more of such devices.

A large number of communication protocols have been developed to allow the exchange of data between different devices. The communication protocols permit the exchange of data in a robust manner, often with error correction and error detection functionality, and for the data to be directed to the intended recipient and recovered for further use.

Because the data may be accessible to other devices, it is vulnerable to interception and observation or manipulation. The sensitive nature of the information requires that steps are taken to secure the information and ensure its integrity.

A number of techniques collectively referred to as encryption protocols and authentication protocols have been developed to provide the required attributes and ensure security and/or integrity in the exchange of information. These techniques utilize a key that is combined with the data.

There are two main types of cryptosystems that implement the protocols, symmetric key cryptosystems and asymmetric or public-key cryptosystems. In a symmetric key cryptosystem, the devices exchanging information share a common key that is known only to the devices intended to share the information. Symmetric key systems have the advantage that they are relatively fast and therefore able to process large quantities of data in a relatively short time, even with limited computing power. However, the keys must be distributed in a secure manner to the different devices, which leads to increased overhead and vulnerability if the key is compromised.

Public-key cryptosystems utilize a key pair, one of which is public and the other private, associated with each device. The public key and private key are related by a "hard" mathematical problem so that even if the public key and the underlying problem are known, the private key cannot be recovered in a feasible time. One such problem is the factoring of the product of two large primes, as utilized in RSA cryptosystems. Another is the discrete log problem in a finite cyclic group. A generator, $\alpha$, of the underlying group is identified as a system parameter and a random integer, k, generated for use as a private key. To obtain a public key, K, a k-fold group operation is performed so that $K=f(\alpha,k)$.

Different groups may be used in discrete log cryptosystems including the multiplicative group of a finite field, the group of integers in a finite cyclic group of order p, usually denoted Zp* and consisting of the integers 0 to p−1. The group operation is multiplication so that $K=f(\alpha k)$.

Another group that is used for enhanced security is an elliptic curve group. The elliptic curve group consists of pairs of elements, one of which is designated x and the other y, in a field that satisfy the equation of the chosen elliptic curve. For a group of order p, the relationship would generally be defined by $y2=x3+ax+b \mod p$. Other curves are used for different underlying fields. Each such pair of elements is a point on the curve, and a generator of the group or an appropriate subgroup is designated as a point P. The group operation is addition, so a private key k will have a corresponding public-key f(kP).

Public-key cryptosystems reduce the infrastructure necessary with symmetric key cryptosystems. A device generates a key pair by obtaining an integer k, which is used as a private key and performing a k-fold group operation to generate the corresponding public-key. In an elliptic curve group, this would be kP. The public-key is published so it is available to other devices.

Devices may then use the key pair in communications between them. If one device wishes to encrypt a message to be sent to another device, it uses the public key of the intended recipient in an encryption protocol. The message may be decrypted and recovered by the other device using the private key.

To assure the recipient of the integrity of a message, the device may also use the key pair in a digital signature protocol. The message is signed using the private key k and other devices can confirm the integrity of the message using the public key kP.

A digital signature is a computer readable data string (or number) which associates a message with the author of that data string. A digital signature generation algorithm is a method of producing digital signatures.

Digital signature schemes are designed to provide the digital counterpart to handwritten signatures (and more). A digital signature is a number dependent on some secret known only to the signer (the signer's private key), and, additionally, on the contents of the message being signed.

Signatures must be verifiable—if a dispute arises as to whether an entity signed a document, an unbiased third party should be able to resolve the matter equitably, without requiring access to the signer's private key. Disputes may arise when a signer tries to repudiate a signature it did create, or when a forger makes a fraudulent claim.

The three fundamental different types of signatures are:
  A digital signature scheme with appendix, which requires the original message as input into the verification process.
  A digital signature scheme with message recovery, which does not require the original message as input to the verification process. Typically the original message is recovered during verification.
  A digital signature scheme with partial message recovery, which requires only a part of the message to be recovered.

The present application is concerned with asymmetric digital signatures schemes with appendix. As discussed above, asymmetric means that each entity selects a key pair consisting of a private key and a related public key. The entity maintains the secrecy of the private key which it uses for signing messages, and makes authentic copies of its public key available to other entities which use it to verify signatures. Usually Appendix means that a cryptographic hash function is used to create a message digest of the message, and the signing transformation is applied to the message digest rather than to the message itself.

A digital signature must be secure if it is to fulfill its function of non-repudiation. Various types of attack are known against digital signatures. The types of attacks on Digital Signatures include:

Key-Only Attack: An adversary only has the public key of the signer.

Know Signature Attack: An adversary knows the public key of the signer and has message-signature pairs chosen and produced by the signer.

Chosen Message Attack: The adversary chooses messages that are signed by the signer, in this case the signer is acting as an oracle.

Attacks on digital signatures can result in the following breakages:

Total Break: An adversary is either able to compute the private key information of the signer, or finds an efficient alternate signing algorithm.

Selective Forgery: An adversary is able to create a valid signature for a particular message.

Existential Forgery: An adversary is able to forge a signature for at least one message.

Universal Forgery: An adversary can forge any message without the secret key.

Ideally, a digital signature scheme should be existentially unforgeable under chosenmessage attack. This notion of security was introduced by Goldwasser, Micali and Rivest. Informally, it asserts that an adversary who is able to obtain the signatures of an entity for any messages of its choice is unable to forge successfully a signature of that entity on a single other message.

Digital signature schemes can be used to provide the following basic cryptographic services: data integrity (the assurance that data has not been altered by unauthorized or unknown means), data origin authentication (the assurance that the source of data is as claimed), and non-repudiation (the assurance that an entity cannot deny previous actions or commitments). Digital signature schemes are commonly used as primitives in cryptographic protocols that provide other services including entity authentication, authenticated key transport, and authenticated key agreement.

The digital signature schemes in use today can be classified according to the hard underlying mathematical problem which provides the basis for their security:

Integer Factorization (IF) schemes, which base their security on the intractability of the integer factorization problem. Examples of these include the RSA and Rabin signature schemes.

Discrete Logarithm (DL) schemes, which base their security on the intractability of the (ordinary) discrete logarithm problem in a finite field. Examples of these include the ElGamal, Schnorr, DSA, and Nyberg-Rueppel signature schemes.

Elliptic Curve (EC) schemes, which base their security on the intractability of the elliptic curve discrete logarithm problem.

One signature scheme in wide spread use is the elliptic curve digital signature algorithm (ECDSA). To generate the signature it is necessary to hash the message and generate a public session key from a random integer. One signature component is obtained by a modular reduction of one co-ordinate of the point representing the public session key, and the other signature component combines the hash and private keys of the signer. This requires inversion of the session private key, which may be relatively computationally intensive.

Verification requires the hashing of the message and inversion of the other component. Various mathematical techniques have been developed to make the signing and verification efficient, however the hashing and modular reduction remain computationally intensive.

It is an object of the present invention to provide a signature scheme in which the above disadvantages may be obviated or mitigated.

SUMMARY

In one aspect, a method for generating an elliptic curve cryptographic signature is provided comprising a first component and a second component for a message using a long term private key, a session private key and a session public key generated from the session private key, the method comprising: generating a first signature component using an x co-ordinate of the session public key and the message; generating a second signature component by combining the long term private key and the first signature component to provide a first result, subtracting the first result from the session private key to provide a second result, and combining the second result with the session private key.

In another aspect, a cryptographic correspondent device is provided, comprising a processor and a memory, the memory having stored thereon a long term private key, the device further having associated therewith a cryptographic corresponding long term public key generated using the long term private key and a cryptographic generator, and an identity, the memory further having stored thereon computer instructions which when executed by the processor cause the processor to implement a elliptic curve cryptographic signature scheme comprising: generating a session private key and cryptographic corresponding session public key; generating a first signature component using an x co-ordinate of the session public key and the message; and generating a second signature component by combining the long term private key and the first signature component to provide a first result, subtracting the first result from the session private key to provide a second result, and combining the second result with the session private key.

According to a further aspect, a signature may be verified by: reconstructing the session public key from the signature components, a long term public key corresponding to the long term private key, and a base point generator; recovering the x co-ordinate of the reconstructed session public key; generating an intermediate component from the first signature component and the message; and verifying the signature by comparing the intermediate component and the recovered x co-ordinate of the session public key.

DESCRIPTION OF THE DRAWINGS

An embodiment of the invention will now be described with reference to the accompanying drawings in which.

DETAILED DESCRIPTION

The protocol is described in the context of an elliptic curve group, generated by a point P which is assumed to have prime order n.

Figure 1:
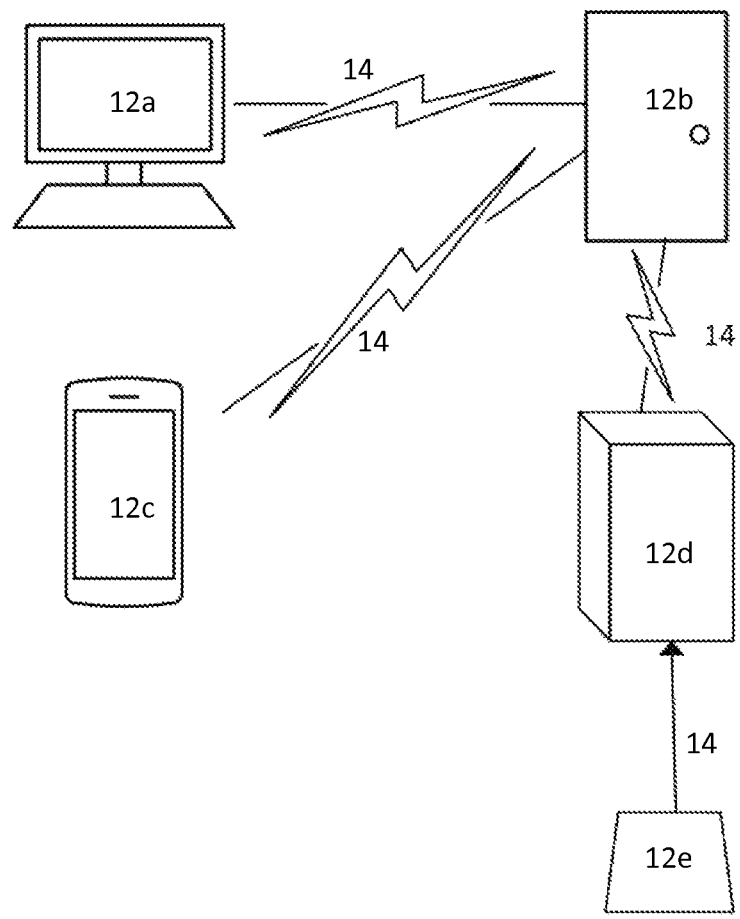
FIG. 1 is a schematic representation of a data communication system.

Referring therefore to FIG. 1, a data communication system 10 includes a plurality of devices 12 interconnected by communication links 14. The devices 12 may be of any known type including a computer 12a, a server 12b, a cellphone 12c, ATM 12d, and smart card 12e. The communication links 14 may be conventional fixed telephone lines, wireless connections implemented between the devices 12, near field communication connections such as Blue tooth or other conventional form of communication.

The devices 12 will differ according to their intended purpose, but typically, will include a communication module 20 (FIG. 2) for communication to the links 14. A memory 22 provides a storage medium for non-transient instructions to implement protocols and to store data as required. A secure memory module 24, which may be part of memory 22 or may be a separate module, is used to store private information, such as the private keys used in the encryption protocols and withstand tampering with that data. An arithmetic logic unit (ALU) 26 is provided to perform the arithmetic operations instruction by the memory 22 using data stored in the memories 22, 24. A random or pseudo random number generator 28 is also incorporated to generate bit strings representing random numbers in a cryptographically secure manner. The memory 22 also includes an instruction set to condition the ALU 26 to perform a block cipher algorithm, such as an AES block cipher, as described more fully below.

Figure 2:
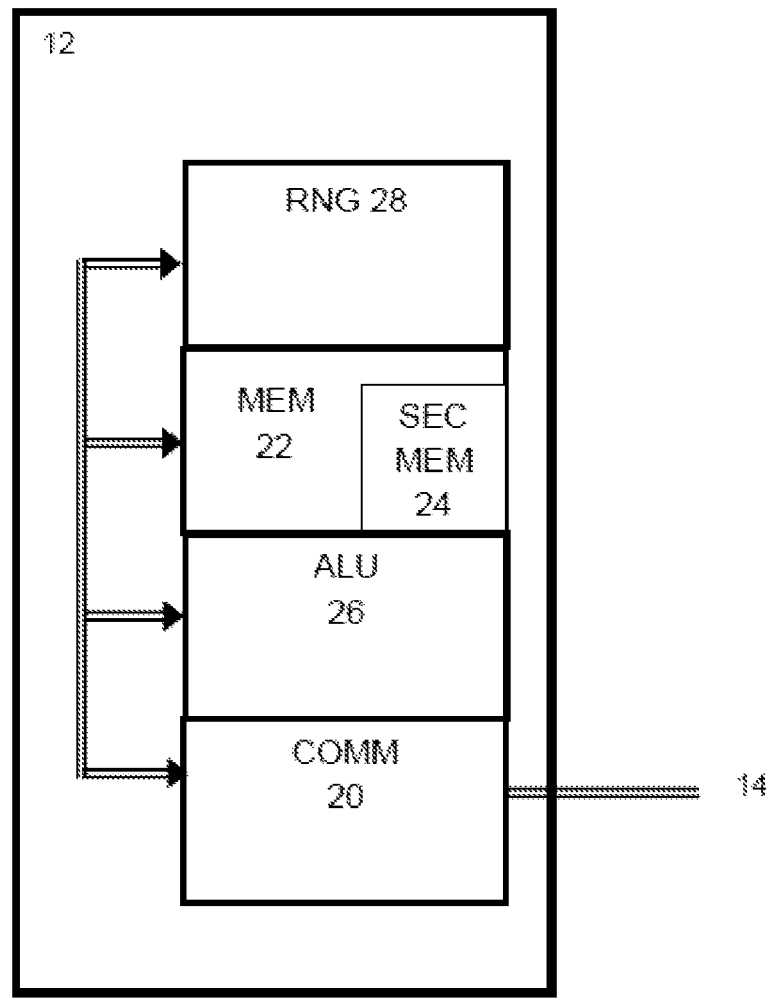
FIG. 2 is a representation of a device used in the data communication system of FIG. 1.
Figure 3:
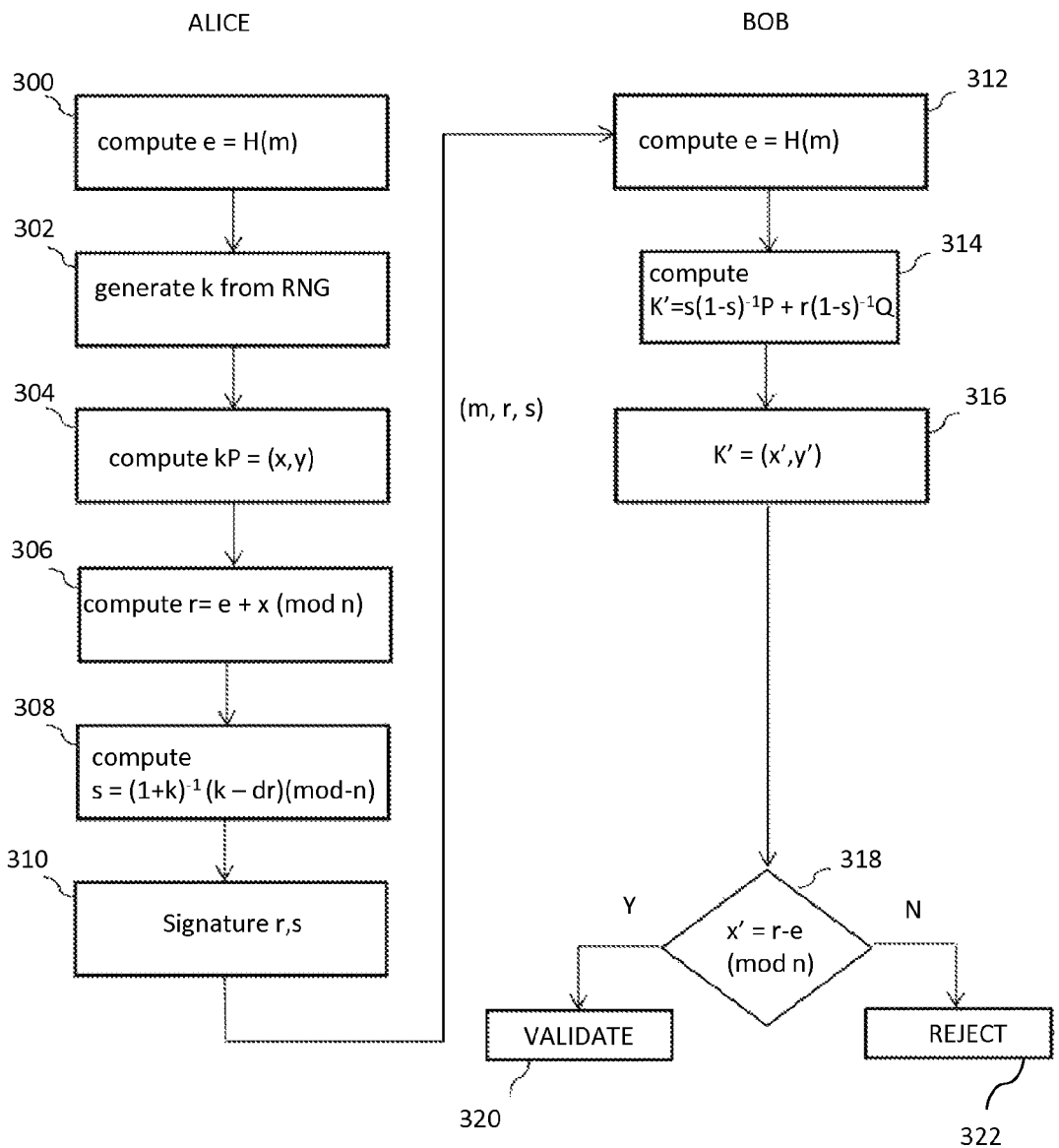
FIG. 3 is a flow chart showing the protocol implemented between a pair of devices shown in FIG. 1.

It will be appreciated that the device 12 illustrated in FIG. 2, is highly schematic and representative of a conventional device used in a data communication system.

The memory 22 stores system parameters for the cryptosystem to be implemented and a set of computer readable instructions to implement the required protocol. In the case of an elliptic curve cryptosystem, elliptic curve domain parameters consist of six quantities q, a, b, P, n, and h, which are:

The field size q
The elliptic curve coefficients a and b
The base point generator P
The order n of the base point generator
The cofactor h, which is the number such that hn is the number of points on the elliptic curve.

The parameters will be represented as bit strings, and the representation of the base point P as a pair of bit strings, each representing an element of the underlying field. As is conventional, one of those strings may be truncated as the full representation may be recovered from the other co-ordinate and the truncated representation.

The secure memory module 24 contains a bit string representing a long term private key d, and the corresponding public key Q. For an elliptic curve cryptosystem, the key Q=dP.

Ephemeral values computed by the ALU may also be stored within the secure module 24 if their value is intended to be secret.

A digital signature protocol is required when one of the devices 12 sends a message, m, to one or more of the other devices, and the other devices need to be able to authenticate the message. The message may, for example, be a document to be signed by all parties, or may be an instruction to the ATM 12d to transfer funds. For the description of the protocol, each device will be identified as an entity, such as Alice or Bob, as is usual in the discussion of cryptographic protocols, or as a correspondent. It will be understood however that each entity is a device 12 performing operations using the device exemplified in FIG. 2.

The entity Alice composes a message m which is a bit string representative of the information to be conveyed to another entity Bob. The signature scheme takes as its input the message, m, and the signer's (Alice's) private key d, which is an integer.

The verification scheme takes as input the message, m, the signer's public key, Q, which is an element of the group generated by the generating point P, and a purported signature on message by the signer. The signature comprises a pair of signature components, computed by the signer and sent to the recipients, usually with the message, m.

To sign message, m, using the signer's private key d:

At block 300, Alice creates a message m and hashes it with a cryptographic hash functions H, to generate e=H(m), and, at block 302, uses the RNG 28 to compute an integer k in the range [1, n−1]. The value k is the ephemeral (or, short term or session) private key of Alice. At block 304, the ALU 24 performs a point multiplication to obtain an elliptic curve point K=kP, which is used as the ephemeral public key of Alice.

The ephemeral public key K is represented by a pair of bits strings, x,y, both of which are elements of the underlying field, as shown at block 304. At block 306, the bit string representing the coordinate x is used as an integer to compute an intermediate value r, r=e+x (mod n).

At block 308, the ALU 24 then computes the second signature component s from the session key k, first signature component r and the private key d:

$$s=(k+1)^{-1}(k-dr)(\mathrm{mod}\ n)$$

As shown at block 310, the component s is an integer, and the signature on the message m is the pair of components r, s. The message m is sent by Alice, together with the signature (r,s) to Bob, using the communication module 20.

The signature protocol may be summarized as:
a. Compute e=H(m), where H is a cryptographic hash function.
b. Compute an elliptic curve point K by randomly selecting an integer k in the range of [1,n−1], and then computing the elliptic curve point kP=K.
c. Let x be the affine x-coordinate of the point kP.
d. Compute the integer r=e+x (mod n)
e. Compute the integer s=(k+1)$^{-1}$(k−dr) (mod n). If s=1, go to step (b).
f. Output (r,s) as the signature of message m.

Upon Bob receiving the message m, he may wish to verify the signature, and thereby confirm it has been sent by Alice, and that its contents have not been changed.

At block 312 Bob hashes the message m, with a cryptographic hash function H, to generate e=H(m). At block 314, an elliptic curve point K' is computed by the ALU 24 using the relationship $$K'=s'(1-s')^{-1}P+r'(1-s')^{-1}Q.$$

where (r',s') is the signature received by Bob, and Q is the public key of Alice, which has been obtained from a trusted source, such as a certificate signed by a Certificate Authority ("CA") and sent by Alice to Bob.

At block 316, the x co-ordinate x' of the point K' is obtained and, at block 318, compared to (r'−e) (mod n), and if they are the same, the signature is verified, as shown at block 320. If not, the signature is rejected and the message may be considered invalid, as shown at block 322.

In summary, the verification protocol requires:
a. Check that r' and s' are in the interval [0,n−1], and s'≠1. If either check fails, then output 'invalid'.
b. Compute the elliptic curve point K'=s'(1−s')$^{-1}$P+r'(1−s')$^{-1}$ Q. If K'=∞, output 'invalid'.
c. Let x' be the x-coordinate of the point K'.

d. Compute e=H(m).

e. Check that x'=(r'−e) (mod n). If the check fails, then output 'invalid'; otherwise output 'valid'.

The first signature component r may be computed as r=(H(m)+x) (mod n). Also, the first signature component r may be computed from x and m using a one way function such as a cryptographic hash function, i.e., r=H(x||m). An alternative computation is available, using a block cipher, such as the AES block cipher, to compute r=$E_x$(m). In an embodiment, the coordinate x is used as the symmetric encryption key for the block cipher, E, which is performed in the ALU.

We claim:

1. A method for generating an elliptic curve cryptographic signature, comprising a first component and a second component, for a message using a long term private key, a session private key and a session public key generated from the session private key, the method comprising:

generating a first signature component comprising adding an x co-ordinate of the session public key to a cryptographic hash of the message;

generating a second signature component comprising multiplying the long term private key and the first signature component to provide a first result, subtracting the first result from the session private key to provide a second result, and multiplying the second result with the session private key.

2. The method of claim 1, wherein the signature may be verified by:

reconstructing the session public key from the signature components, a long term public key corresponding to the long term private key, and a base point generator;

recovering the x co-ordinate of the reconstructed session public key;

generating an intermediate component from the first signature component and the message; and verifying the signature by comparing the intermediate component and the recovered x co-ordinate of the session public key.

3. The method of claim 2, wherein the intermediate component is generated as a subtraction of the hash of the message from the first signature component.

4. The method of claim 1, wherein the first signature component is generated as the sum of the hash of the message and the x co-ordinate of the session public key.

5. The method of claim 1, wherein combining the second result with the session private key comprises:

generating a third result from the session private key; and combining the inverse of the third result with the second result.

6. The method of claim 5, wherein generating the third result comprises adding one to the value of the session private key.

7. The method of claim 1, wherein the first signature component is generated by encrypting the message with a block cipher using the x co-ordinate of the session public key as a symmetric key.

8. The method of claim 1, wherein the first signature component is generated by applying a cryptographic hash function to the concatenation of the message and the x co-ordinate of the session public key.

9. A cryptographic correspondent device comprising a processor and a memory, the memory having stored thereon a long term private key, the device further having associated therewith a cryptographic corresponding long term public key generated using the long term private key and a cryptographic generator, and an identity, the memory further having stored thereon computer instructions which when executed by the processor cause the processor to implement a elliptic curve cryptographic signature scheme comprising:

generating a session private key and cryptographic corresponding session public key;

generating a first signature component comprising adding an x co-ordinate of the session public key to a cryptographic hash of the message; and generating a second signature component comprising multiplying the long term private key and the first signature component to provide a first result, subtracting the first result from the session private key to provide a second result, and multiplying the second result with the session private key.

10. The device of claim 9, wherein the signature may be verified by:

reconstructing the session public key from the signature components, a long term public key corresponding to the longer term private key, and a base point generator;

recovering the x coordinate of the reconstructed session public key;

generating an intermediate component from the first signature component and the message; and verifying the signature by comparing the intermediate component and the recovered x co-ordinate of the session public key.

11. The device of claim 10, wherein the intermediate component is generated as a subtraction of the hash of the message from the first signature component.

12. The device of claim 10, wherein the first signature component is generated by encrypting the message with a block cipher using the x co-ordinate of the session public key as a symmetric key.

13. The device of claim 9, wherein the first signature component is generated as the sum of the hash of the message and the x co-ordinate of the session public key.

14. The device of claim 9, wherein the first signature component is generated by applying a cryptographic hash function to the concatenation of the message and the x co-ordinate of the session public key.

15. The device of claim 9, wherein combining the second result with the session private key comprises generating a third result from the session private key; and combining the inverse of the third result with the second result.

16. The device of claim 15, wherein generating the third result comprises adding one to the value of the session private key.

* * * * *